United States Patent Office 2,894,090
Patented July 7, 1959

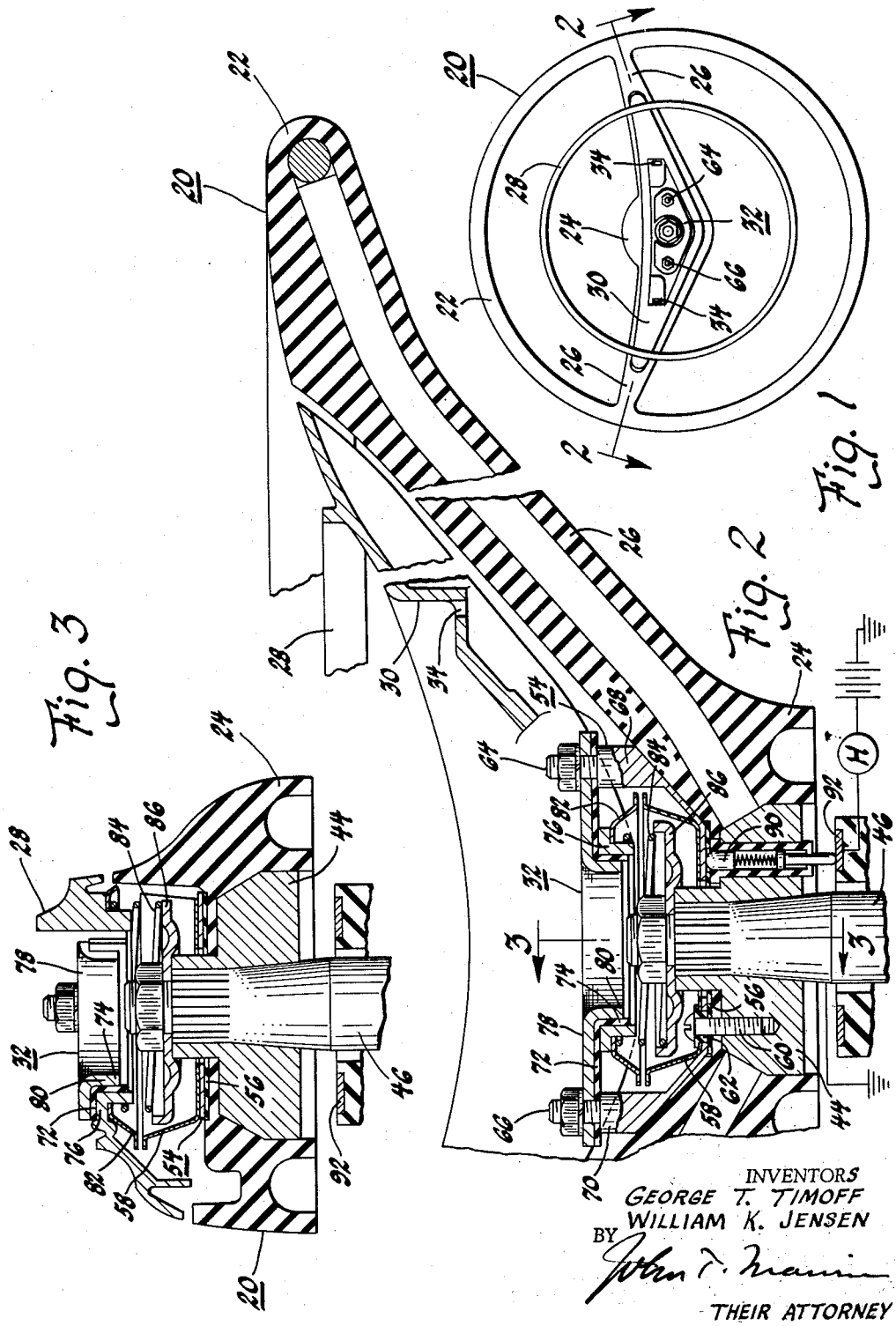

2,894,090

HORN BLOWING MECHANISM

George T. Timoff, Drayton Plains, and William K. Jensen, Royal Oak, Mich., assignors to General Motors Corporation, Detroit, Mich., a corporation of Delaware Application September 26, 1957, Serial No. 686,476

2 Claims. (Cl. 200—61.56)

This invention relates to horns and horn blowing devices and is specifically directed to a horn blowing switch for use in connection with a vehicular steering wheel.

An object of the invention is to provide a horn blowing switching device for use with a steering wheel having a horn blowing ring wherein the steering wheel is of deep dish design, that is to say, the rim of the wheel is considerably higher than the hub thereof. The device is set forth herein, due to the specific structure thereof, makes possible a switch which requires a minimum of movement of the horn blowing ring to close the circuit therethrough whereby the switch is operative through a small magnitude of movement of the horn blowing ring.

Another object of the invention is to provide a horn blowing switch for a deep dish vehicular steering wheel including a horn blowing ring positioned remote from the switch but operatively connected thereto whereby the switch may be actuated through small magnitude movements of the horn blowing ring which pivotally moves the switch structure at points spaced from the center of the wheel.

Further objects and advantages of the present invention will be apparent from the following description, reference being had to the accompanying drawings wherein preferred embodiments of the present invention are clearly shown.

In the drawings:

Fig. 1 is a plan view of one type of steering wheel including a horn blowing ring wherein the present switch is included in the structure.

Figure 2 is a partial sectional view taken on line 2—2 of Figure 1.

Figure 3 is a sectional view taken on line 3—3 of Figure 2.

Steering wheels, especially automotive steering wheels, have, in the past, included horn blowing rings for actuating the horn switching mechanism which is usually positioned in the hub of the wheel. These horn blowing rings are generally concentric with the rim of the wheel but of less diameter and may be contacted by the fingers of the operator without removing his hand from the wheel whereby depression of the ring for closing the horn blowing switch can be easily and safely accomplished.

The present invention is directed to a horn switch to be used in connection with a horn blowing ring and a deep dish wheel wherein the switch is pivoted at points spaced from the center of the wheel whereby the fulcrum for the switch closing operation is intermediate the hub of the wheel and the horn blowing ring.

Referring specifically to the drawings, Figure 1 shows a plan view of an automotive steering wheel at 20 which includes a rim portion 22, a hub 24 connected to the rim by a plurality of spokes 26. A horn blowing ring is shown at 28 which has a generally triangular, centrally located depression 30 in the spoke portion thereof which depression surrounds a horn blowing switch 32. The depression may be closed by snapping a plastic emblem cover therein, not shown, which engages slots 34 and is thereby held in place.

The switch mechanism 32 comprises a support member 54 which is centrally apertured to pass over the hub 44 and rest upon an insulating washer 56 positioned between the base portion of member 54 and the top of the hub 44. A contact pan 58, termed hereinafter as the lower contact pan, is placed in inverted position upon the central portion of the support member 54, and the pan 58 and member 54 are both secured to the hub 44 by a plurality of bolts 60 (one of which is shown) which are insulated from the pan 58 and member 54 by flanged collars 62 of insulating material that pass through the pan and support. The bolts 60 thread into the hub 44.

The support member 54 includes two upwardly extending spaced bolts 64 and 66 respectively that are carried by upwardly disposed extensions 68 and 70 respectively on the member 54 which provide positioning shoulders. A centrally apertured insulating member 72 having a downwardly extending flange 74 disposed around its central aperture is placed over the bolts 64 and 66. A portion 76 of the horn blowing ring 28 fits snugly around the outside of flange 74 and a clamping plate 78 fits over the bolts 64 and 66 and on top of the insulating member 72 and is fixedly held to the support member 54 by nuts threaded onto the bolts 64 and 66. The clamping plate 78 has an inturned central flange 80 which holds the insulating flange 74 in place with respect to the horn blowing ring portion 76.

A second contact pan 82 fits on the horn ring portion 76 and registers with the pan 58. The two pans 58 and 82 are held in spaced relation and the horn ring 28 is likewise held in position by a spring 84 which bears on pan 82 at one end thereof and on a plate 86 at the other. The plate 86 is bolted to the top of the steering post 46. Thus, when the horn ring is depressed adjacent its periphery, the portion 76 thereof is likewise depressed which compresses spring 84 to allow a portion of pan 82 to contact a portion of pan 58 to close the horn circuit as will be hereinafter explained.

The spacing of contact pans 58 and 82 may be varied by changing the thickness of the insulating members 56 and 72 to provide desired clearances.

A brush 90 carried by the hub and insulated therefrom is spring pressed into engagement with the member 54 and with a ring contact 92 carried by a stationary portion of the steering mast jacket. This ring is connected to the one terminal of a horn indicated at H, the other side of which is connected to the battery. When the horn ring is depressed, the ground circuit to the horn is completed through the steering column 46 to cause the horn to blow.

It is understood that in all cases the steering wheel is of conventional construction including a metal spider and rim reinforcement welded together and to the hub and covered with a hard rubber or plastic compound.

The present horn switch 32 is simple in design, reliable in its action and provides a multiplying action during switch closing movements to lessen the required travel of the horn ring to close the switch. Further, the horn ring 28 is held fixedly against transverse movement through the restraining action of the flange 80 which is fixed to the steering wheel. This assures a stable device that eliminates misalignment and noise.

While the embodiments of the present invention as herein disclosed constitute preferred forms, it is to be understood that other forms might be adopted.

What is claimed is as follows:

1. A horn blowing switch mechanism for use with a deep dish steering wheel having a metallic hub, comprising, a support member having a base portion which is centrally apertured to pass over the hub, an insulating washer positioned between the base portion of said member and a top surface of the hub, a first contact pan placed in inverted position upon the base portion of said support member, insulated fastener means securing said first contact pan and said support member as well as said insulating washer relative to the metallic hub, at least a pair of upwardly disposed extension portions provided by said support member and located radially outwardly from said first contact pan, a centrally apertured insulating member placed over said extension portions and having a central downwardly extending flange, a horn blowing ring means including a central annular portion adapted to fit snugly around the outside of said flange, a clamping plate means adapted to be held fixedly to said extension portions of said support member and separated from said central annular portion of said horn blowing ring means by said centrally apertured insulating member, a second contact pan adapted to fit directly on said central annular portion of said horn blowing ring means, an annular plate attached to the metallic hub, and spring means normally serving to maintain predetermined spacing between said first and second contact pans and adapted to be compressed relative to said annular plate until said central annular portion of said horn blowing ring means is moved sufficiently to permit closure of electrical contact of said first and second contact pans relative to each other, said central annular portion of said horn blowing ring means being fulcrumed relative to said clamping plate means held fixedly to said extension portions of said support member located radially outwardly from said first contact pan.

2. The horn blowing switch mechanism of claim 1 wherein a conducting brush is carried in insulated relation to the metallic hub and which is adapted to engage electrically said base portion of said support member and a ring contact stationary relative to the metallic hub.

References Cited in the file of this patent

UNITED STATES PATENTS

| | | |
|---|---|---|
| 2,065,611 | Pulleyblank | Dec. 29, 1936 |
| 2,631,204 | Kibiger | Mar. 10, 1953 |
| 2,829,212 | Cislo | Apr. 1, 1957 |